United States Patent

Buck et al.

[11] 4,320,399
[45] Mar. 16, 1982

[54] MICROWAVE PULSE SPECTRUM CONTROL

[75] Inventors: Daniel C. Buck, Anne Arundel; Gregory K. Sinon, Laurel, both of Md.

[73] Assignee: Westinghouse Electric Corp., Pittsburgh, Pa.

[21] Appl. No.: 195,551

[22] Filed: Oct. 9, 1980

[51] Int. Cl.³ .............................................. G01S 7/32
[52] U.S. Cl. .............................................. 343/17.1 R
[58] Field of Search ................................. 343/17.1 R

[56] References Cited

U.S. PATENT DOCUMENTS

| 3,618,094 | 11/1971 | Ward | 343/17.1 R |
| 3,688,214 | 8/1972 | Goldie | 343/17.1 R X |
| 4,123,755 | 10/1978 | Fishbein et al. | 343/17.1 R |

*Primary Examiner*—T. H. Tubbesing
*Attorney, Agent, or Firm*—W. E. Zitelli

[57] ABSTRACT

Generally, pulsed radar transmitters of the solid-state variety generate rectangularly shaped RF envelope pulses having discontinuities in the rise and fall edges thereof. It has been identified that, while maximizing power radiation efficiency, these sharp rise and fall times additionally provide for excessive energy in the spectral sidelobes about the transmission frequency of the radar signal. This excessive spectral sidelobe energy has been found to degrade the performance of closely operating pulsed radars through mutual interference. The present invention provides for pulse shaping control in a solidstate transmitter of a pulsed radar for reducing the spectral sidelobe energy being transmitted. The control is directed to modulating the shape of the rectangular RF envelope pulses to have substantially continuously rising and falling edges. In the preferred embodiment, a bipolar microwave transistor is coupled, in a common base configuration, cascadedly between low and high power amplification stages of the radar transmitter. A rectangularly pulsed RF power signal conducted through the transistor is modulated in accordance with a preshaped pulsed power supply signal supplied to the transistor coincidently therewith to render a corresponding power output RF pulse envelope substantially free of discontinuities in the rise and fall edges thereof.

10 Claims, 7 Drawing Figures

MICROWAVE PULSE SPECTRUM CONTROL

GOVERNMENT CONTRACT

The invention herein described was made in the course of or under Contract No. F33657-79-C-0040 with the Department of the Air Force.

BACKGROUND OF THE INVENTION

The present invention relates to airborne pulsed radars which detect target threats, in general, and more particularly, to a solid-state pulsed radar transmitter, especially for use therein, which includes pulse shaping control to reduce the spectral sidelobe energy being transmitted.

Presently, pulsed type radars are being included on military aircraft, like fighters and bombers, for example, to detect the presence of target threats. In general, military aircraft of this type fly in relatively close formation and as a result, their radars are operating in close proximity to one another. Recently, especially with the advent of solid-state transmitters, the shape of the transmitted radar pulse has been made rectangular to maximize the total effective radiated radar power. Moreover, the transmitter designs which include high-efficiency class C amplifiers have successfully achieved very sharp edged short rise and fall times for the rectangularly transmitted energy pulses. While these accomplishments have maximized output radar power, they have also increased the spectral bandwidth of the transmitted pulses providing for excessive energy in the spectral sidelobes about the transmitted frequency. In turn, this excessive spectral bandwidth energy being transmitted has at time degraded the performance of the other aircraft radars operating in close proximity by causing false alarms due to mutual interference between radar sets. That is, the radar receiver of an aircraft in formation may receive the sidelobe energy level of a signal transmitted by a neighbor aircraft in formation and falsely identify the received transmitted energy signal as a target, thereby causing a false alarm to occur.

Through analysis, it has been identified that the excessive bandwidth of energy in the transmission spectrum is primarily a result of the sharp inflection points of the rectangular shaped pulses being transmitted. In fact, if the pulse waveform could be generated with no finite discontinuities, as much as a 60 db/decade sidelobe rolloff in the spectral bandwidth associated therewith may be achieved. One example of a pulse waveform having a continuously rising edge is expressed by the following formula:

$$P_{max}[1 - \cos(\pi t / T_{rise})]$$

From the above, it appears that to improve the performance of radar sets operating in close proximity to one another, some sort of pulse shaping control is of paramount importance, especially a control which strives to maintain power efficiency. Such a control is described here below in a solid-state transmitter circuit embodiment which utilizes class C amplifiers in the pulse forming operation thereof.

SUMMARY OF THE INVENTION

In accordance with the present invention, a pulse shaping control is included in a solid-state pulsed radar transmitter. The radar transmitter includes an RF signal generator, a PRF timing signal generator, a gating means governed by the generated PRF timing signal to gate the generated RF signal into a train of rectangularly shaped envelope pulses having discontinuities in the rise and fall edges thereof, and a plurality of amplification stages for amplifying the pulsed RF signals prior to transmission thereof. The included pulse shaping control comprises a pulse generator a solid-state power modulation device and a pulse shaper. The pulse generator generates a power supply timing signal in time relationship with the rectangularly shaped envelope pulses of the RF signal. The solid-state power modulation device has a power input port coupled to the output of one amplification stage, a power output port coupled to the input of another amplification stage, and a power supply port. The pulse shaper is coupled between the output of the pulse generator and the power supply port of the power modulation device to pulse a power supply signal supplied thereto and to shape the pulse to have substantially continuously rising and falling edges. Accordingly, the power modulation device is operative to modulate the power of an input RF pulse envelope in accordance with the shaped power supply signal coupled thereto to render a corresponding power output RF pulse envelope substantially free of discontinuities in the rise and fall edges thereof.

More specifically, the pulse shaper includes circuitry which is activated by the leading edges of the generated PRF timing signals to generate a train of corresponding rectangularly shaped power supply timing pulses, each pulse being delayed from its corresponding PRF timing signals by a first predetermined time interval, preferably selected commensurate with the accumulated time delays of the amplification stages preceding the power modulation device, and having a pulse width of a second predetermined time interval. In addition, the pulse shaper includes an RLC network and transistor circuit combination which is activated by the rise and fall edges of the pulsed power supply timing signal to effect, in cooperation with the power modulation device, shaped power supply pulses having substantially continuously rising and falling edges. In one aspect of the invention, the pulse generator, pulse shaper and power modulator operate cooperatively to cause the shaped power supply pulses to arrive coincidently with corresponding RF envelope pulses at their respective ports of the power modulation device.

In one embodiment of the invention, the power modulation device includes a bipolar microwave transistor in a common base configuration having an impedance matching circuit coupling the pulsed power supply signal to the collector thereof, the impedance matching circuit having elements configured and selected in value to match substantially the output impedance of the bipolar transistor. Further included in the power modulator is a suppression circuit coupled to the collector of the bipolar transistor for suppressing degenerate parametric oscillations which may be impressed on the modulated power output signal. In connection with this embodiment of the invention, the collector-base junction of the bipolar microwave transistor has capacitive properties which, under certain biasing conditions, effectively provide for charge storage. Accordingly, the pulse shaper contours the rising edges of the pulsed power supply signals based on the RLC circuit parameters thereof and independently contours the falling edge based on the capacitive charge storage properties of the bipolar microwave transistor.

DESCRIPTION OF THE PREFERRED EMBODIMENT

Figure 1:
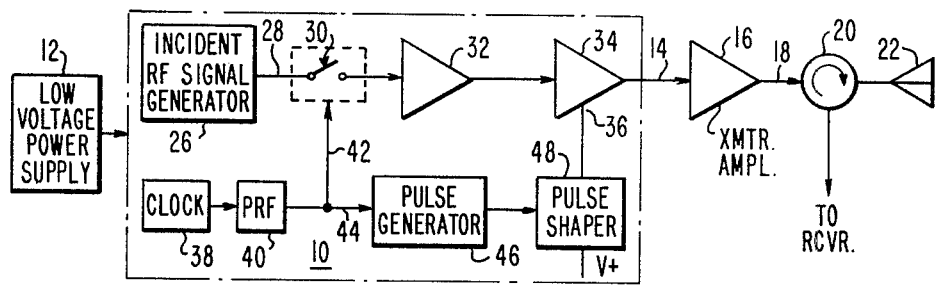
FIG. 1 is a block diagram schematic of a pulsed radar transmitter suitable for embodying the principles of the present invention.

Referring to FIG. 1, a steady-state transmitter embodiment generally includes an integrated microwave unit 10, which is powered by a conventional low voltage power supply 12. The unit 10 derives a train of pulsed envelopes of RF energy at a predetermined pulse repetition frequency (PRF). This derived signal, which may be output over line 14, is usually supplied to a plurality of high power amplification stages as represented by the amplifier symbol 16. Normally, these high power amplifiers 16 are of the class C variety. The high power pulsed RF signal output 18 of the amplifiers 16 may be fed through a conventional circulator unit 20 to drive a radar antenna 22. Incidently, reflections received by the radar 22 may be passed through the circulator 20 to a radar receiving channel RCVR not shown in FIG. 1.

In more specific detail, the unit 10 may include a conventional incident RF signal generator 26 for generating RF signals, which for the present embodiment may be in the L band range, for example. The output of the generator 26 may be coupled over line 28 to a pole position of a gated functional switch 30. The tapped position of the switch function 30 may be coupled to a plurality of low level pulse amplification stages denoted in FIG. 1 by the amplifier symbol shown at 32. It is not uncommon to have as many as seven or eight amplifier stages for these low level amplification purposes.

As part of the present invention then, the output of the amplification stages 32 may be coupled to the input of a solid-state power modulation device 34, the output port of which being coupled to the plurality of amplifiers 16 utilizing signal line 14. The amplifier 34 may include a third port at 36 which may be utilized for introducing a power supply signal.

Further included in the unit 10 are conventional clock and pulse repetition frequency timing circuits 38 and 40, respectively. The generated PRF timing signal from 40 may be conducted over signal line 42 to govern the operation of the switch 30. And furthermore, in accordance with the present invention, may also be supplied to a pulse generator circuit 46 over signal line 44. Moreover, a pulse shaper circuit 48 may additionally be disposed in the unit 10 between the output of the pulse generator 46 and the power supply port 36 of the power modulator 34. The pulse shaper circuit 48 may be supplied with a power supply signal V+ which may be derived from the power supply 12.

Figure 2:
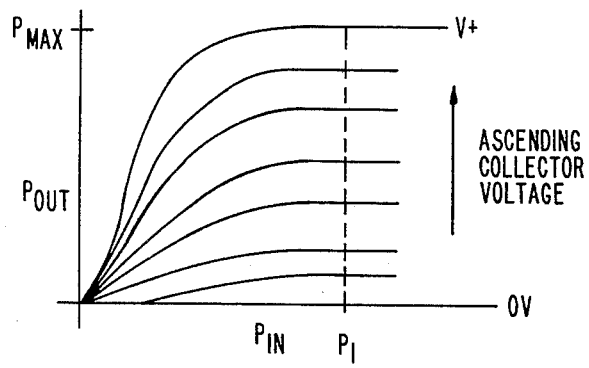
FIG. 2 is a graph of a family of curves depicting typical power out/power in transfer characteristics of a power modulation device suitable for use in the embodiment of FIG. 1.

For the present embodiment, the power modulator 34 may include a microwave high power bipolar NPN transistor assembled in a common base circuit configuration designed from class C amplification operation. The power out/power in transfer characteristics of the bipolar device may be similar to that shown by the family of waveforms in the graph of FIG. 2. If the bipolar transistor is configured to have its emitter coupled as the input port, its base coupled to a predetermined voltage level and its collector coupled to the power supply signal at 36, then each waveform in the family of waveforms of the graph in FIG. 2 is representative of a fixed voltage coupled to the collector of the power modulator transistor. Referring to FIG. 2, if the input power is held at some fixed level, say $P_1$ for example, then as the collector coupled power supply voltage is varied from 0 to V+ (as shown by the dashed line traversing the curves) the output power derived by the transistor will be modulated commensurately from 0 to P max, respectively.

Now, it is known that if the collector coupled voltage is maintained at a fixed value say V+, for example, and the power input signal is supplied with a sharp edged rectangular shape, then the power output signal will likewise have a sharp edged rectangular shape with no modulation accomplished. However, if during the rectangular sharp edged power input pulse, the collector coupled supply voltage is varied from 0 to V+ and then subsequently returned from V+ back to 0 in accordance with some predetermined time function or preshaping characteristic, then the output power pulse waveform may be modulated in accordance therewith.

For example, suppose that the pulse shaper 48, which will be described in greater detail herebelow is configured to preshape the rising edge of a pulsed power supply signal to have a time modulated shape similar to that shown by the dashed line waveform 60 in FIG. 3. Because of the predefined transfer characteristics as shown by the family of curves in the graph of FIG. 2, the rising edge of the output power signal may be modulated to have a similar shape as that shown by the curve 60. Going one step further, if the curve 62 is typical of the power out/power in transfer characteristics of an L-band three stage class C amplifier suitable for use as the high power amplification stages 16 in the embodiment of FIG. 1, then when the amplifier combination at 16 is driven by the rising edge curve designated by the dashed waveform 60 of FIG. 3, an output pulse RF envelope having a leading edge similar to that designated by the waveform 64 in FIG. 3 may be desirably produced.

Figure 3:
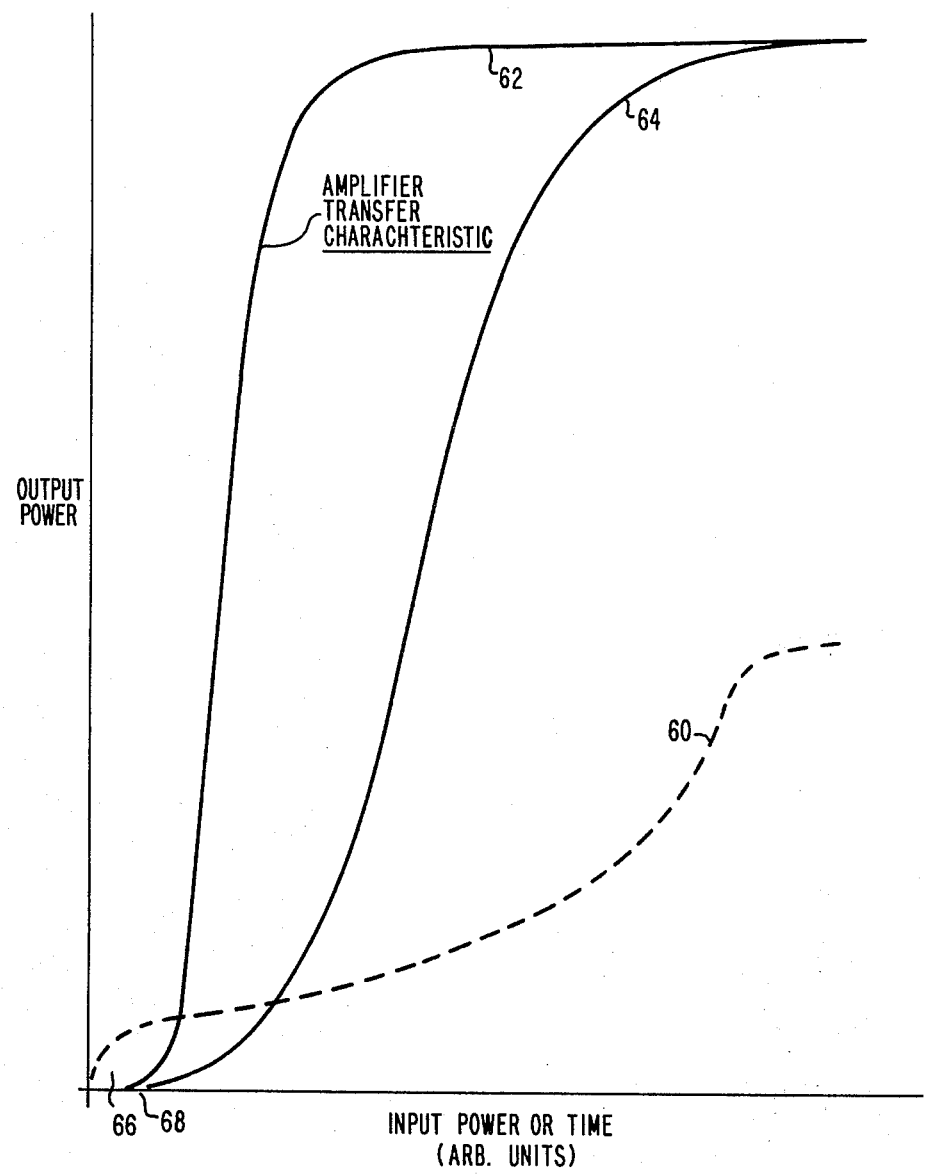
FIG. 3 is a graph depicting typically shaped edges of the modulated RF envelope pulses in accordance with operation of the embodiment of FIG. 1.

Closer examination of the waveforms of FIG. 3 indicate that fine details in the waveform 60 to the left of the point 66 have negligible effect on the output waveshape 64 because of the transfer characteristic curve 62 has in this region very low values. But on the other hand, the waveform 60 may be shaped to pass by the threshold denoted at 68 smoothly and monotonically in order to prevent ripples in the desired output pulse shaping characteristics as shown by the waveform of 64. Note that it is this preshaped waveform of 60 that the embodiment described in connection with FIG. 1 creates by the cooperation of the pulse shaper and power modulator elements 48 and 34, respectively, to provide for the appropriate modulation of the collector voltage of the power modulator stage 34.

Figure 4:
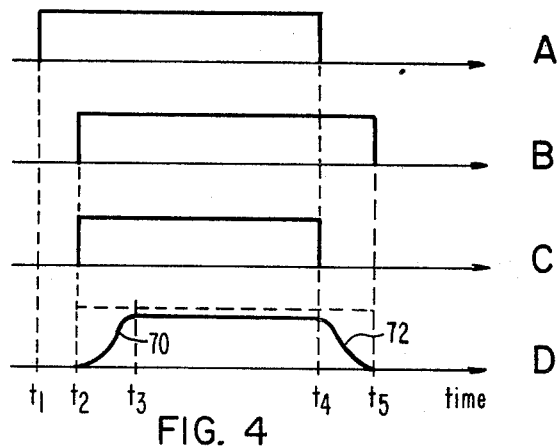
FIG. 4 depicts time waveforms 4A through 4D which are used to describe a typical generation of the embodiment shown in FIG. 1.

The time waveforms 4A through 4D shown in FIG. 4 may be referred to in the description of a typical operation of the transmitter embodiment of FIG. 1. Generally, the PRF timing signal generated by the circuit 40 in cooperation with the clock circuit 38 controls the switch 30 to gate the RF signal generated by the circuit 26 to provide for a train of very sharp edged rectangular shaped RF envelope pulses, the space between pulses being the inter-pulse period of the PRF. The solid line pulse in the waveform 4A of FIG. 4 is exemplary of one of the pulses of the gated RF pulse train. As the RF pulse train passes through the low level amplification stages 32 it becomes delayed in time a predetermined interval. So, in the present example, if the gated RF pulse is gated over the time interval from t1 to t4 at the switch 30, then after passing through the amplification stages 32, it may be shifted in time to extend over the time interval from t2 to t5 as shown in the waveform of 4B of FIG. 4. Consequently, a time delay residing between t2 and t1 has been effectuated.

The present embodiment compensates for this delay time by deriving a power supply signal timing pulse in the pulse generator 46 in time relationship with the RF pulse envelope. To accomplish this, the generator 46 includes a selectable time delay which acts on the PRF timing signal supplied thereto over line 44 to provide for pulse coincidence of the power supply signal pulses and RF pulsed envelopes at the power modulator 34. In addition, the pulse generator 46 further includes circuit elements to extend the pulse width over a suitable time interval say from t2 to t4, for example, as exemplified by the waveform 4C of FIG. 4. Furthermore, the pulse shaper 48 is govered by this timing pulse and operates in cooperation with the power modulator stage 34 to pulse and shape the rising and falling edges of the power supply signal V+ provided thereto in accordance with some predetermined time function. This pulse shaping operation will be better understood from the description of a suitable embodiment of a pulse shaper 48 found hereinbelow. Accordingly, the pulse shaper 48 is activated by the power supply signal timing pulse, especially the sharp rising and falling edges which are shown to occur at t2 and t4, respectively, as illustrated in the waveform 4C to effect continuously rising and falling edges in the shaping of the power supply pulse. An example of this shaping, is shown by the rising 70 and falling 72 edges in the solid line waveform of 4D in FIG. 4. Note that the timing operations of the pulse generator 46 and pulse shaper 48 provide for shaped power supply signal pulses between the times t2 and t5 which fall substantially within the RF pulse envelopes an example of which being denoted by the dashed waveform envelope in 4D.

Figure 5:
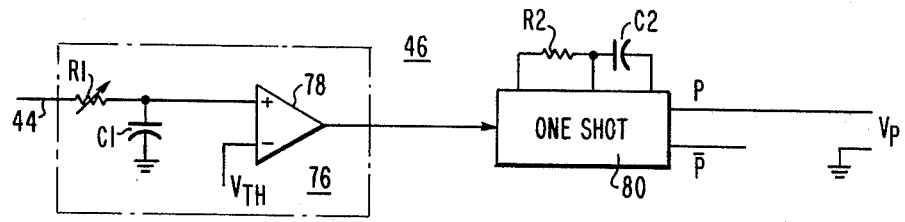
FIG. 5 is a circuit schematic of a pulse generator suitable for embodying in the radar transmitter depicted in FIG. 1.

A suitable circuit configuration for use in the embodiment of FIG. 1 as the pulse generator 46 is shown in FIG. 5. The pulse delay portion 76 may be implemented with a simple RC network including elements R1 and C1 and a conventional comparator 78. For example, a variable resistor R1 may have one input coupled to ground through the capacitor C1 and tied to one input of the comparator 78. The other input of the variable resistor R1 may be tied to the signal line 44. The other input of the comparator 78 may be coupled to a variable threshold voltage $V_{th}$. The predetermined delay time may be varied by either varying the resistance parameter R1 or the threshold voltage $V_{th}$.

Moreover, the output signal from the comparator 78 may be coupled to a one shot circuit 80 which may be triggered by the leading edge thereof. The pulse width of the generated pulse from the one shot 80 may be regulated by the values chosen for the resistive and capacitive parameters R2 and C2 associated therewith. The one shot may provide for both of the output pulse signal complements P and $\overline{P}$. One of the outputs, say P, for example, may be used as the power supply signal timing pulse denoted as $V_p$. It is understood that the $\overline{P}$ output may be used in place of the P output if an additional inversion stage is desired without deviating from the invention.

Typically in operation, a PRF timing pulse is provided over line 44 to the delay circuit 76 wherein it is delayed for a first predetermined time. In the present embodiment, the delayed leading edge of the PRF timing pulse may trigger the one shot 80 to provide for the timing pulse $V_p$ having a width of a second predetermined time interval (refer to waveform 4C in FIG. 4). Accordingly, this operation is repeated for each PRF timing pulse received at line 44.

It is understood that many pulse shaping circuit arrangements may be used in conjunction with the particular power modulation device selected. For the present embodiment, independent shaping of the leading and trailing edges of the power supply signal pulse for modulating the power in the device 34 was used. This was accomplished through the use of an RLC network and transistor circuit combination in conjunction with the stored charge properties of the microwave bipolar transistor. A circuit found suitable for these purposes for use in the embodiment of FIG. 1 is shown in FIG. 6.

Figure 6:
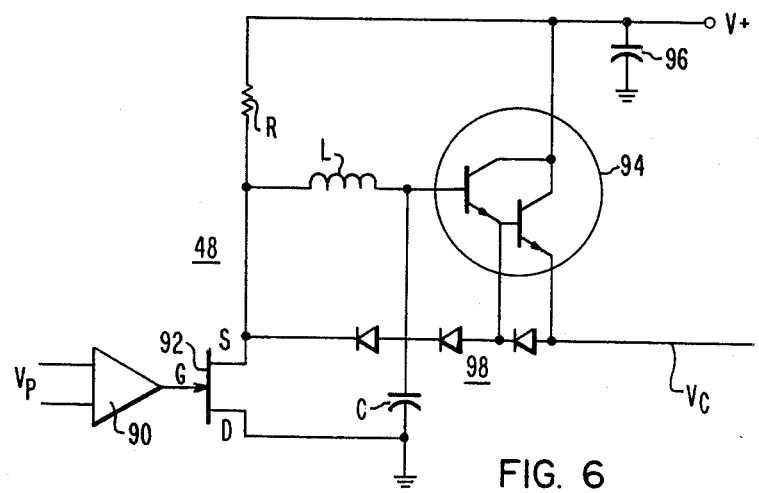
FIG. 6 is a circuit schematic of a pulse shaper suitable for embodying in the radar transmitter depicted in FIG. 1.

Referring to the schematic of FIG. 6, the power supply signal timing pulse $V_p$ may be coupled to at least one amplification stage 90 whose output may in turn be coupled to the gate junction G of at least one field effect transistor 92. An RLC circuit is provided in the base circuit of a Darlington transistor configuration 94. The collectors of the Darlington 94 are commonly coupled to the V+ power supply signal. Adequate capacitive decoupling as shown at 96 is additionally provided for the power supply V+ signal lines. The emitter of the output Darlington stage provides the controlled power supply voltage $V_c$ which is coupled to the collector of the modulating bipolar transistor at 34. A series of solid state diodes at 98 provide protection to the Darlington transistor base-emitter junctions against breakdown at high reverse biasing voltages.

In a typical, operation, the collector supply voltage $V_c$ rises in accordane with the Darlington LC base circuit time constant. An example of this is shown in the waveform 4D at 70 between the times t2 and t3. Conversely, the modulated stage turn off makes use of the charge storage effects of the bipolar microwave transistor being used in 34. For the particular bipolar transistor being used, which may be similar to the type manufactured by Microwave Semiconductor Company having a model number 74021 or 74043, under full modulation voltage conditions, the collector-base modulated stage junctions look capacitive (see 99 in FIG. 7, for example). Therefore, during turnoff, the minority carrier lifetime of the junction is long enough to slowly turn off the device through the diodes 98, FET 92 discharge path. It is understood that this path is activated during the falling edge of the power supply timing waveform $V_p$ (see waveform 4D at 72 between t4 and t5). It can be shown that for the microwave bipolar transistors included in the present embodiment for power modulation, the properties of the PN junctions under bias conditions provide effectively adequate values of capacitance 99 which vary inversely with the reverse voltage thereacross.

Figure 7:
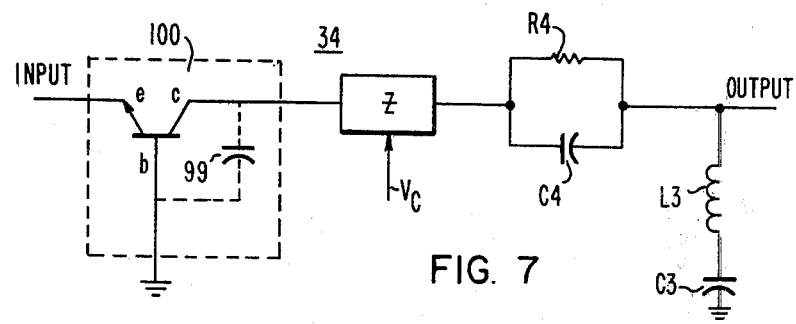
FIG. 7 is a circuit schematic of a power modulation device for use in the embodiment of FIG. 1.

Another aspect of the power modulator 34 in connection with the use of a bipolar microwave transistor is that of the associated bias and impedance matching circuitry which is desirable for in-band frequency performance. This impedance matching circuitry generally appears in series with the collector. Referring to FIG. 7, the microwave bipolar modulating transistor, shown at 100, has its emitter coupled to the input port, its base coupled to a fixed voltage potential, preferably ground, and its collector coupled to the power supply control voltage $V_c$ through a block of bias and matching circuitry designated as Z. In the present embodiment, this matching circuitry may be arranged by any combination of LC elements generally aligned in series with the output collector of the modulating transistor 100. And, it is understood that the details of such an arrangement is considered conventional and in no way any part of the present invention.

However, with the present configuration in the embodiment of FIG. 7, it has been determined that, with the unusual conditions of the microwave bipolar transistor 100 being operated over a wide range of frequency and collector voltage levels, a degenerate parametric oscillation may be present at times in the output power signal. This undesirable oscillation has been experimentally determined to occur around the approximate frequency of one-half of the main or carrier frequency of the RF power signal and generally manifests itself as sharp inflection points on the leading and trailing edges of an otherwise rounded RF power output pulse envelope. Consequently, higher spectral sidelobe levels may appear than that expected for the continuously shaped rise/fall edge case.

Various techniques were studied for the suppression of these undesired out-of-frequency band signals, in order to regain a smooth continuum on the rise and fall edges of the RF output pulse envelope. For the present embodiment, an LC resonator, including inductive and capacitive elements L3 and C3, respectively, is added to the collector output of the modulated stage circuitry (see FIG. 7). The inductive and capacitive values chosen for the resonator provide for transfer characteristics resulting in a short around the one-half main frequency point and an open around the main frequency point. Moreover, a series capacitor C4 is included having a parameter value to provide a path for the desired in-band frequency signal at the main frequency point, while a resistive element R4 is provided in parallel with C4 to furnish loading for the one half frequency signal on its way to ground through the resonator circuit L3-C3.

As a result of general experimentation it was uncovered that microwave bipolar devices from different manufacturers react to a modulated collector voltage in distinct ways. While the parametric oscillation at one-half the main frequency was in evidence with a great variety of similar transistors at some drive and voltage level, the severity of the problem varied greatly from transistor to transistor. Therefore, it is generally preferred that some suppression circuitry, similar to the type described in connection with the embodiment of FIG. 7, be included in the power modulator 34 and especially tuned to the frequency of the parametric oscillations to ensure spectral purity under the variety of conditions, including the range of power drive levels, modulation voltages and out-of-band loading, . . . etc. under which the microwave bipolar transistors operate to modulate the power of the RF signal conducted therethrough.

We claim:

1. In a solid-state pulsed radar transmitter including an RF signal generator, a PRF timing signal generator, a gating means governed by the generated PRF timing signals to gate the generated RF signal into a train of rectangularly shaped envelope pulses having discontinuities in the rise and fall edges thereof, and a plurality of amplification stages for amplifying the pulsed RF signals prior to transmission thereof, the improvement comprising:

a pulse generator for generating a power supply timing signal in time relationship with the rectangularly shaped envelope pulses of the RF signal;

a solid-state power modulation device having a power input port coupled to the output of one amplification stage of said plurality, a power output port coupled to the input of another amplification stage of said plurality, and a power supply port; and a pulse shaper coupled between the output of said pulse generator and said power supply port of said power modulation device and operative to pulse a power supply signal supplied thereto and to shape said pulses to have substantially continuously rising and falling edges in cooperation with said power modulation device;

said power modulation device being operative to modulate the power of an input RF pulse envelope in accordance with the shaped power supply signal coupled thereto to render a corresponding power output RF pulse envelope substantially free of discontinuities in the rise and fall edges thereof.

2. The improvement in accordance with claim 1 wherein the pulse generator includes:

a first circuit activated by the leading edges of the generated PRF timing signals to generate the leading edges of corresponding control timing signals delayed by a first predetermined time interval; and a second circuit triggered by the delayed leading edges of said control timing signals to generate corresponding timing pulses having pulse widths of a second predetermined time intervals.

3. The improvements in accordance with claim 2 wherein the first circuit includes means for selecting the first predetermined delay time interval commensurate with the accumulated time delays of the amplification stages preceding the power modulation device.

4. The improvement in accordance with claim 1 wherein the pulse shaper includes an RLC network and transistor circuit combination activated by the rise and fall edges of the pulsed power supply timing signal to effect, in cooperation with the power modulation device, shaped power supply pulses having substantially continuously rising and falling edges.

5. The improvement in accordance with claim 1 wherein the solid-state power modulation device includes:

a bipolar microwave transistor in a common base circuit configuration, the emitter operative as a power input port, the base coupled to a fixed potential; and an impedance matching circuit for coupling the shaped power supply signal to the collector of said bipolar transistor, said matching circuit having elements configured and selected in value to match substantially the output impedance of said bipolar transistor.

6. The improvement in accordance with claim 5, wherein the solid-state power modulation device further includes a suppression circuit coupled to the collector output of the bipolar microwave transistor for suppressing degenerate parametric oscillations which may be impressed on the modulated power output signal.

7. The improvement in accordance with claim 6 wherein the suppression circuit includes:
 an LC resonator for providing a shorting path to a fixed potential for the signals having frequencies around the parametric oscillations while providing an open path from a fixed potential for the modulated RF signals; and
 a parallel RC network which furnishes loading to the parametric oscillation signal through the resonator while passing the modulated RF signal substantially unloaded.

8. The improvement in accordance with claim 5 wherein the collector-base junction of the bipolar transistor has capacitive properties which, under certain biasing conditions, effectively provide for charge storage.

9. The improvement in accordance with claim 8 wherein the pulse shaper includes an RLC network and transistor circuit combination activated by the rise and fall edges of the pulsed power supply timing signal; and
 wherein the rising contour of the shaped power supply signal is based on the RLC circuit parameter of the pulse shaper and the falling contour thereof is independently based on the capacitive charge storage properties of the base-collector junction of the bipolar microwave transistor.

10. The improvement in accordance with claim 1 wherein the pulse generator includes means for generating the power supply timing signal to govern the pulse shaper to cause the shaped power supply pulses to arrive coincidently with corresponding RF envelope pulses at their respective ports of the power modulation device with the power supply pulses occurring in time within the widths of the corresponding RF envelope pulses.

* * * * *